United States Patent Office
3,224,319
Patented Dec. 21, 1965

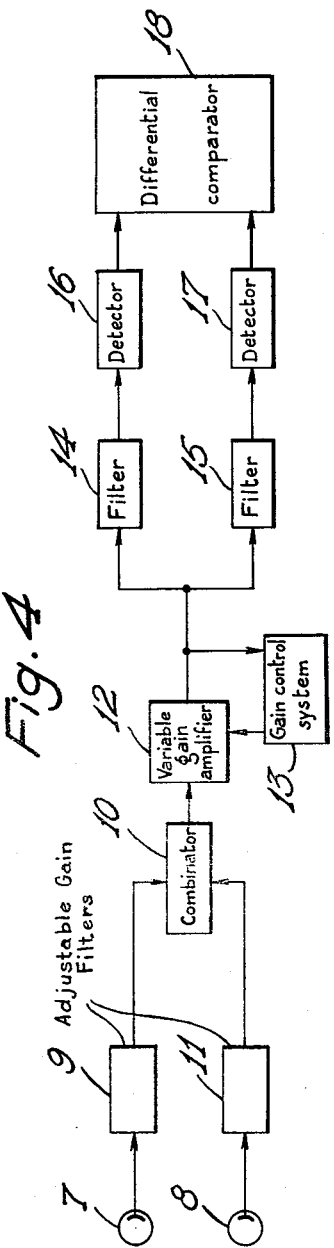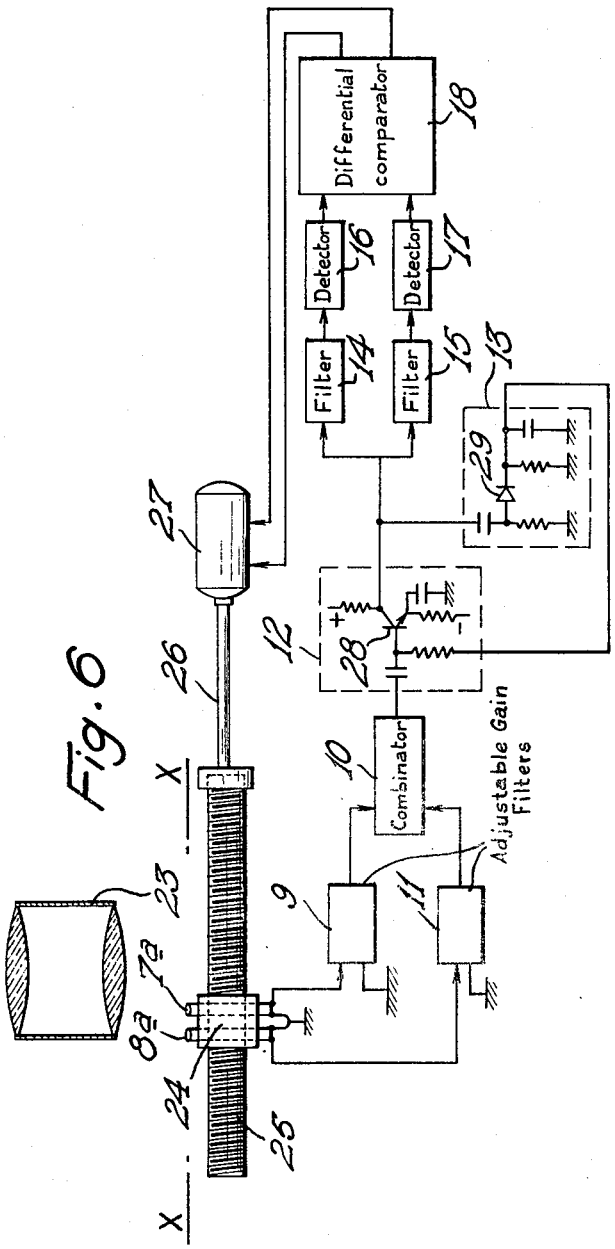

3,224,319
OPTICAL TELEMETRY DEVICES
André Charles Robert, Eaubonne, and Gilles Eugène Romain Trincard, Paris, France, assignors to Sud-Aviation Société Nationale de Constructions Aéronautiques, Paris, France
Filed May 2, 1962, Ser. No. 191,942
Claims priority, application France, May 4, 1961, 860,682, Patent 1,296,011
5 Claims. (Cl. 88—1)

This invention relates to an optical telemetry system and device for measuring the distance of an obstacle from a predetermined point. Optical telemetry is based on the fact that if a source of light illuminates an obstacle at a certain distance $h$, the rays reflected by the obstacle and reaching a sighting point located at a distance $d$ from the source along a straight line at right angles with respect to the lighting line joining said source of light and said obstacle will form an angle $\alpha$ with said straight line such that $\tan \alpha = h/d$. Thus, if the angle $\alpha$ and the distance $d$ (constant for the apparatus) are known, the distance $h$ of the obstacle from the source of light can be found. In practice a photoelectric cell is displaced at the sighting point in the focal plane of a sighting optical system for determining the coincidence between the center of said cell and that of the image received thereby. Unfortunately, the accuracy that can be achieved in measuring the angle $\alpha$ is low owing to the fact that the light shed on a photoelectric cell so displaced at the sighting point passes through a maximum value, which corresponds to a standing point the localization of which is physically not precise.

In addition, the light which may originate from other sources and be reflected by different obstacles, and which strikes the cell, makes such measurements very tricky.

As is well known, in order to remain unaffected by the ambient lighting, the source may not radiate continuous light but light which is interrupted at a certain frequency, in which case the angular corrections will then take only the variable part of the light received into account.

Another known method calculated to enable higher accuracy to be achieved in the measurement of the angle $\alpha$, consists in substituting, for the single cell at the sighting point, two adjoining cells that are displaced simultaneously in the focal plane of a mirror or lense, along said straight line, and in comparing the electrical signals generated by these two cells. The amplitudes of said signals become equal when the two cells are equally lighted, the distance $h$ being then determined by means of the aforementioned relation as a function of the distance between the middle point of said cells and the lighting line, i.e. of the distance $d$. Any device responsive to said distance $d$ may be used for indicating the distance $h$ between the source and the obstacle.

The difficulty then resides in analysing the electrical signals furnished by the cells. Hitherto recourse was had to two distinct amplifiers for amplifying the signals from said cells and it was found virtually impossible to make the gains of the two amplifiers vary simultaneously in strict obedience to the same law.

With a view to obtaining the highest possible degree of accuracy, this invention has for its object an optical telemetry system for the utilization of a device equipped with two displaceable adjoining photo-electric cells wherein the obstacle is illuminated with light rays modulated at different frequencies, the light rays reflected by the obstacle are converted into series of electrical signals of equal amplitude that are respectively modulated at said frequencies, the said series of signals are amplified with a common adjustable gain and the single complex signal obtained thereby is divided into signals which are respectively modulated at the frequencies of the emitted light rays and detected, the detected signals being compared together and the differential error signal thus obtained being cancelled when the displaceable cells are equally illuminated. The modulation of the light rays at different frequencies are effected successively or simultaneously.

The invention further has for its object an optical telemetry apparatus equipped with two displaceable adjoining photo-electric cells for executing the method specified hereinbefore, said apparatus comprising a component which is rotated in front of a source of light and which is equipped with sets of apertures for the rays from said source, which sets of apertures have different widths and spacings, and a number of photo-electric cells equal to that of said sets receiving the light rays reflected by the obstacle each photo-electric cell being connected to a frequency channel corresponding to one of the ray modulation frequencies, the signals transmitted through said channels being applied to an adder connected to a single amplifier with automatic gain control from which the amplified complex output signals are transmitted to auxiliary frequency channels respectively corresponding to the ray modulation frequencies and connected to detectors the output signals of which are applied to a differential comparator the differential error signal of which becomes null when the two photo-electric cells are equally lighted.

The rotated component preferably consists either of a disc with peripheral sets of cogs that move past a punctual light source, or of a hollow drum provided with sets of superposed slots moving past a linear light source disposed within the drum.

The description which follows with reference to the accompanying drawings, filed by way of example only and not of limitation, will give a clear understanding of how the invention may be carried into practice.

In the drawings:

FIG. 4 is a block diagram of the receiver associated to the light ray emitter according to the invention;

FIG. 6 is a more detailed illustration of the receiver of FIG. 4 which represents, on the one hand, the mounting of the photoelectric cells and, on the other hand, the constitution of the variable gain amplifier and of its associated gain automatic control system.

Figure 1:
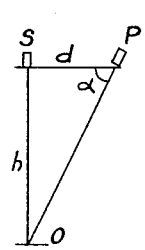
FIG. 1 is an explanatory diagram of the optical telemetry system.

The schematic diagram relating to the optical telemetry system is shown in FIG. 1. A light source S illuminates an obstacle O at a certain distance $h$, and the rays reflected by the obstacle O and reaching a sighting point P located at a distance $d$ from the source S along a straight line at right angles with respect to the lighting line SO make an angle $\alpha$ with said straight line SP such that $\tan \alpha = h/d$. Knowing the angle $\alpha$ on the one hand, and the distance $d$ on the other (which is a constant of the apparatus), it is thus possible to find the distance $h$ separating the obstacle from the source.

Figure 2:
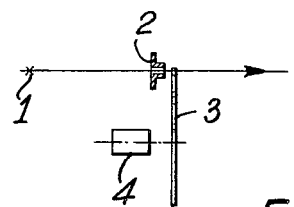
FIG. 2 is a schematic view of a light ray emitter executed in accordance with a first embodiment.
Figure 3:
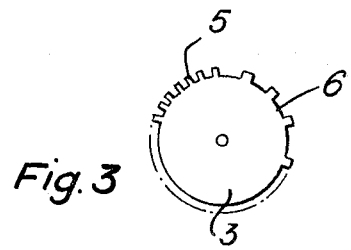
FIG. 3 is a front view of the cogged disc of the emitter of FIG. 2.

In the embodiment shown in FIGS. 2 and 3, the continuous light furnished by a light source 1 passes through a diaphragm and through a cogged disc 3 driven by a motor 4. The disc is provided along its periphery with cogged sectors 5 and 6 having different cog widths and gaps so as to furnish two light rays modulated at two different frequencies F and $f$, corresponding respectively to the cogged sectors 5 and 6. The successive modulated light rays reflected on the obstacle then strike two photo-electric cells 7 and 8 (FIG. 4) disposed at the sighting point P.

In the manner well known per se, the two photo-electric cells 7, 8 are disposed at P adjacent one to the other in the focal plane of a lens or a mirror located at the sighting point and are simultaneously displaceable in this plane along the straight line PS. The signals received by the cell 7 pass through a filter 9 which isolates one of the light frequencies, F say, and injects it into a combinator or adder 10. The signals recieved by the cell 8 pass through a filter 11 which isolates the other frequency $f$ and also injects it into the same combinator 10.

For a light beam which is modulated as described precedingly and reflected along the mediatrix of the two cells 7 and 8, i.e. along a line passing through the center of the interval between said cells, the amplitudes of the signals issuing from the filters 9 and 11 be made identical by adjusting on the gain of the filters 9 and 11, in order to compensate for any differences between the cells. This being so, the assemblies consisting of the cell 7 and its filter 9, on the one hand, and the cell 8 and its filter 11, on the other, will behave after the manner of two photo-electric elements each of which is adjusted to a given frequency but both of which have the same sensitivity. Thus the gain in each filter compensates the sensitivity of the associated cell.

Any difference in the light ray intensities reflected onto each of the two moving cells 7 and 8, due to the fact that the line OP does not pass through the center of the interval between said cells, results in a difference in amplitude in the output signals from the filters 9 and 11. On issuing from the adder 10 the signals are applied to a single variable gain amplifier 12 the gain of which can be automatically varied with reference to any datum whatsoever, for instance by causing the peak of the amplified signals to remain included within given limits. Such automatic gain control system, well known per se, is shown schematically at 13.

Exploitation of the signals issuing from the amplifier 12 can be accomplished in accordance with any known method. As an example, the signal may be divided anew by means of two filters, of which one, 14, has an output frequency identical to that of the filter 9, namely F, the other, 15, an output frequency identical to that of the filter 11, namely $f$. The filters 14 and 15 are followed by detectors 16 and 17, respectively. The detected direct signals are applied to a comparator 18 which furnishes a differential error signal having a frequency (F−$f$) and an amplitude equal to the difference between the amplitudes of said detected signals. Said differential error signal is null if the line OP passes through the center of the interval between the two cells, i.e. if said two cells are equally lighted. Otherwise the cells 7 and 8 are displaced in the focal plane of the mirror or the lens until the output signal from the differential comparator 18 be null at the time the center of said interval coincides with the center of the image given by the mirror or the lens and is at a distance $d$ from the source S. Any device responsive to said distance $d$ may be used for indicating the distance $h$ between the source and the obstacle, taking into account the relation between $h$ and $d$.

FIG. 6 represents in a more detailed manner the receiver according to FIG. 4.

As well known, in the embodiment shown in said FIG. 6, the adjacent cells 7a and 8a are disposed in the focal plane X—X of an objective 23 and displaceable in said plane. For this purpose, said cells are carried by a nut 24 fixed against rotation and engaging a screw 25 connected to the shaft 26 of an electric motor 27 rotatable in both directions. Said cells are respectively connected with the filters 9 and 11 connected in turn with the combinator or adder 10.

The output signals of said combinator 10 are applied to a conventional variable gain amplifier 12 having a transistor 28 the collector of which is connected with filters 14 and 15. The output signal of amplifier 12 is detected by a detector 29 forming a part of the gain automatic control system 13. The output voltage of said system, i.e. the automatic control voltage, is applied in the conventional manner to the base of transistor 28 in order to vary the gain thereof so that the mean value of the output voltage of said amplifier 12 remains constant.

The output voltage of the differential comparator 18 is applied to motor 27. The latter drives screw 25 and moves nut 24 as well as cells 7a and 8a in the focal plane X—X until the illuminations of said cells through objective 23 are equal. At that time the output voltage of the differential comparator becomes null and motor 27 stops.

Figure 5:
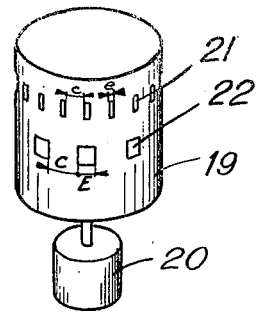
FIG. 5 is a highly diagrammatic illustration in perspective of a light ray emitter executed in accordance with a second embodiment.

In the embodiment illustrated in FIG. 5, the source of light, assumed to be linear, is disposed along the axis of a cylindrical drum 19 which is driven by a motor 20 and provided with two sets of slots 21 and 22. These slots 21, of small width $e$ and spacing $c$, and 22, of greater width E and spacing C, produce, when the drum 19 is rotated, two different light rays modulated at different frequencies F′ and $f'$. The light rays reflected by the obstacle then strike the two cells 7 and 8 of the assembly shown in FIG. 4.

It is manifest that, without departing from the scope of the invention, many modifications could be made to the method and embodiments hereinbefore described. In particular, instead of utilizing two light rays modulated at different frequencies, the disc 3 or the drum 19 could comprise a plurality of sets of cogs or slots, of different widths and gaps, with a view to obtaining a multiplicity of light rays modulated at different frequencies.

What we claim is:

1. In optical telemetry apparatus for measuring the distance between an obstacle and a predetermined point and of the type having a light source disposed at said predetermined point for illuminating the obstacle, an optical sighting system disposed in the vicinity of said source for receiving light rays reflected by said obstacle and two photo-electric cells disposed adjacent one another in the focal plane of said optical system at a fixed interval and displaceable in said focal plane along a straight line at right angles to the lighting line joining said source and said obstacle for determining the position in which said cells are equally lighted, whereby the distance between the center of said interval in said position of the cells and said lighting line is related to the distance to be measured; the improvement comprising a rotatable device disposed in the path of the light beam emitted by the source and having two sets of apertures for said beam, which sets of apertures have different widths and spacings for generating two light rays respectively modulated at different frequencies, means for driving said device in rotation, two frequency channels respectively connected to the two photo-electric cells and respectively corresponding to the frequencies of the two modulated light rays received by said cells after reflection by the obstacle, adding means connected to said two frequency channels, a single automatic gain amplifier fed by said adding means, and means supplied by said amplifier for generating an error signal related to the difference existing between the amplitudes of the signals transmitted through said frequency channels, comprising means connected to the single automatic gain amplifier for dividing the complex signal delivered by said amplifier into two series of amplified signals respectively modulated at the frequencies of the two modulated light rays, means for respectively detecting said amplified signals and a differential comparator connected to said detecting means for delivering the error signal, whereby said two photo-electric cells can be displaced to a position in which the amplitude of the signals are equal and said error signal becomes null, and in which position said cells are equally lighted and can then serve as a reference for evaluating the distance between the obstacle and said predetermined point.

2. Apparatus according to claim 1, wherein the two frequency channels comprise two adjustable gain filters respectively interconnecting the two photo-electric cells and the adding means and respectively adjusted to the modulation frequencies of the two light rays.

3. Apparatus according to claim 2, wherein the two photo-electric cells and the two adjustable gain filters connected to said cells are adjusted to furnish electrical signals having a given amplitude for a given peak brightness, the gain of each filter compensating the sensitivity of the corresponding cell.

4. Apparatus according to claim 1, wherein the means for dividing the complex signal delivered by the single automatic gain amplifier comprises two filters connected to said amplifier and having output frequencies respectively equal to those of the modulated light rays received by the photo-electric cells.

5. In optical telemetry apparatus for measuring the distance between an obstacle and a predetermined point and of the type having a light source disposed at said predetermined point for illuminating the obstacle, an optical sighting system disposed in the vicinity of said source for receiving light rays reflected by said obstacle and two-photo-electric cells disposed adjacent one another in the focal plane of said optical system at a fixed interval and displaceable in said focal plane along a straight line at right angles to the lighting line joining said source and said obstacle for determining the position in which said cells are equally lighted, whereby the distance between the center of said interval in said position of the cells and said lighting line is related to the distance to be measured, a rotatable device disposed in the path of the light beam emitted by the source and having two sets of apertures for said beam, which sets of apertures have different widths and spacings for generating two light rays respectively modulated at different frequencies, means for driving said device in rotation, the improvement comprising two adjustable gain filters respectively connected to the two photo-electric cells and respectively adjusted to the modulation frequencies of the two light rays, adding means connected to said filters, a single automatic gain amplifier fed by said adding means, two filters connected to said amplifier and having output frequencies respectively equal to those of the modulated light rays received by the photo-electric cells for generating amplified signals at said frequencies, respectively, means for respectively detecting said amplified signals, and a differential comparator connected to said detecting means for delivering an error signal related to the difference existing between the amplitudes of the detected signals, whereby said two photo-electric cells can be displaced to a position in which the amplitude of the signals are equal and said error signal becomes null, in which position said cells are equally lighted.

References Cited by the Examiner

UNITED STATES PATENTS

| | | | |
|---|---|---|---|
| 2,350,820 | 6/1944 | Rettinger | 88—1 |
| 2,490,899 | 12/1949 | Cohen | 88—1 X |
| 2,510,347 | 6/1950 | Perkins | 250—209 X |
| 2,949,536 | 8/1960 | Langton. | |
| 3,014,131 | 12/1961 | Hutchens et al. | |
| 3,054,898 | 9/1962 | Westover et al. | 88—1 X |

OTHER REFERENCES

Electronics, "Optar-A New System of Optical Ranging," April 1950, pages 102–105.

JEWELL H. PEDERSEN, *Primary Examiner.*